Oct. 10, 1967     O. PLETSCHER     3,345,681
HINGE CONNECTION ASSEMBLY FOR THE SUPPORT
OR STAND OF BICYCLES AND THE LIKE
Filed Feb. 16, 1965
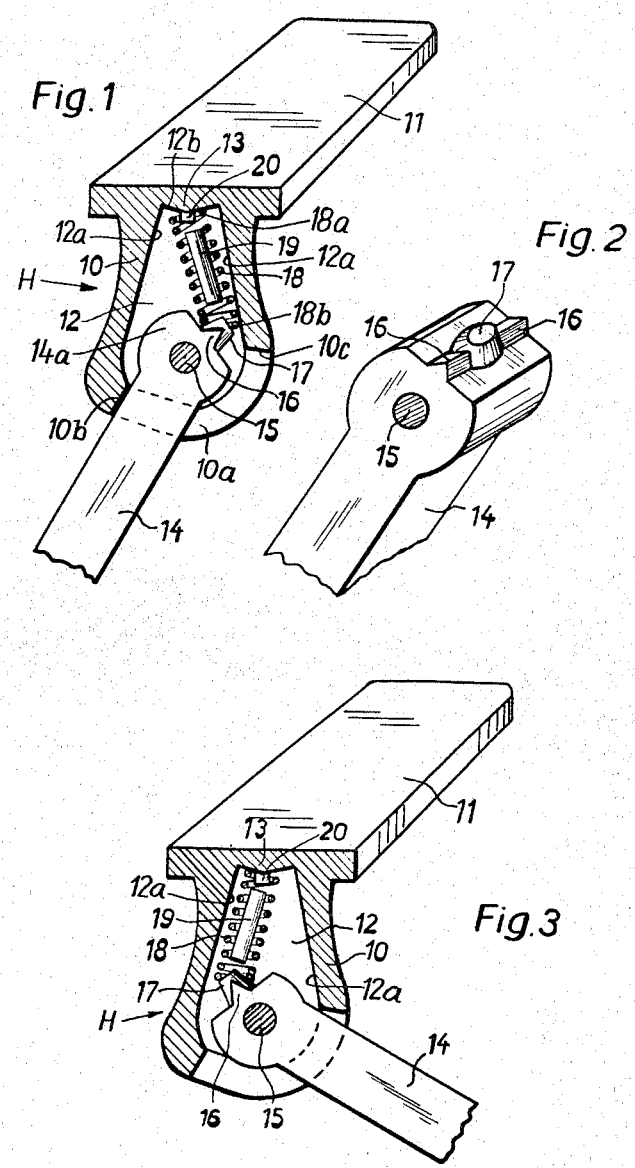

United States Patent Office 3,345,681
Patented Oct. 10, 1967

3,345,681
HINGE CONNECTION ASSEMBLY FOR THE SUPPORT OR STAND OF BICYCLES AND THE LIKE
Oskar Pletscher, Marthalen, Zurich, Switzerland, assignor to Gebruder Pletscher, Marthalen, Zurich, Switzerland
Filed Feb. 16, 1965, Ser. No. 433,108
Claims priority, application Austria, Feb. 18, 1964, A 1,350/64
8 Claims. (Cl. 16—182)

ABSTRACT OF THE DISCLOSURE

An arrangement in which a support arm of a bicycle kick-stand is pivotably mounted in a support housing and is urged into operative and inoperative positions by a spring which bears directly at one end on a wedge-shaped countersurface on the housing and at the opposite end on a wedge-shaped countersurface of the support arm.

The present invention relates to an improved hinge connection assembly or coupling arrangement for at least one rockable support arm of a bicycle support or stand of the type incorporating a rocker or tiltable spring constructed as a helical spring which urges the aforesaid support arm into both of its terminal positions against appropriate impact surfaces of a support housing, and wherein such sring bears at one end against the support arm and at its other end against the support housing.

Hinge connection assemblies for bicycle supports are well known in the art and one such arrangement is known in which there are provided tiltable hinge joint shafts. However, at such tiltable hinge joint shafts, which are subjected to a relatively great pressure by the helical spring, there appears very large frictional resistance. This causes a very rapid wear of the articulation or hinge joint and, of even greater importance, makes it much more difficult to tilt the support or prop arm from one or the other position.

Accordingly, the present invention proposes an improved construction of hinge connection arrangement for bicycle supports or the like which enables the support arm to be rocked very easily from one position into the other without having to overcome any frictional forces in the tiltable articulation joint.

A particular object of this invention is directed to the provision of an improved hinge connection assembly for the supports of bicycles or the like which is of relatively simple and inexpensive construction, exhibits a minimum of moving elements, and incorporates means cooperating with the support arm which is used for propping-up the bicycle or otherwise such that, not only can such support arm be moved from one terminal position to the other with a minimum of effort and without having to overcome any mentionable frictional forces, but further, positively retains such support arm in the one or the other terminal position.

Broadly speaking, and in order to implement these and still further objects of the invention the new and improved hinge connection assembly for bicycle supports, according to one very important inventive aspect, is manifested by the feature that the countersupport means for the spring are constructed in the form of substantially wedge-shaped edges.

It is further to be appreciated that tiltable hinge joint constructions for bicycle supports are known wherein there is provided a guide bolt for the tiltable or rocker spring which is pivotably articulated through the agency of a transverse bolt to the bicycle support arm.

Now, a further important aspect of the present invention concerns itself with a simplification of such construction and arrangement of the aforesaid guide bolt. To this end, the invention contemplates providing the rocker spring with a known stabilization bolt which is loosely and displaceably guided in the aforesaid rocker spring assumed to be a helical spring. This stabilization bolt advantageously prevents buckling or bending-out of the rocker spring. The previously mentioned wedge-shaped edges of the support arm and the support housing can be provided with pin means at the central region of these respective members, such pin means projecting past the associated edge and preventing sliding-off of the aforesaid rocker spring from these edges.

It should also be understood that the inventive bicycle support or prop is of considerably simpler construction than heretofore known bicycle supports because both of the previously employed hinge joint shafts at the ends of the rocker spring are no longer used and, therefore, mounting thereof is also dispensed with. Due to the elimination of these hinge joint shafts friction of any type is prevented, since the tiltable or rocker spring advantageously rolls upon the countersupport edges without friction.

Other features, objects and advantages of the present invention will become apparent by reference to the following detailed description and drawing in which:

FIGURE 1 is a vertical cross-sectional view through the support housing of the inventive hinge connection assembly with a portion of the support arm shown in the one terminal position;

FIGURE 2 is a fragmentary perspective view of the portion of the support arm depicted in FIGURE 1, particularly showing details of the countersupport means for the tiltable spring of the inventive hinge connection assembly and;

FIGURE 3 is a vertical cross-section view through the support housing of the hinge connection assembly, similar to the view of FIGURE 1, showing the support arm located in the other terminal position.

Describing now the drawing and, in particular, directing attention to the preferred embodiment of hinge connection assembly H for bicycle supports or the like shown in FIGURE 1, it will be seen that a support housing 10 is provided with a flange 11 serving for attachment of the bicycle support unit to a frame (not shown) of the bicycle. It will be understood that the manner of connection of the bicycle support unit to the bicycle frame is known in the art and does not constitute part of the subject matter of the present invention, wherefore it is deemed unnecessary to illustrate such attachment.

Considering again the support housing 10 it will be seen that such is provided with a recess or opening 12 bounded by inclined walls 12a. At the upper end 12b of this recess 12 there is provided a substantially wedge-shaped edge 13. Furthermore, a pin 20 is provided at the central region of this wedge-shaped edge 13. Moreover, a support or prop arm 14 for the bicycle, is mounted in the support housing 10 so as to pivot about a bolt or shaft 15. As shown, this support arm 14 extends externally of the support housing 10 via an opening 10a and can pivot between two terminal positions, depicted in FIGURES 1 and 3, so as to contact impact surfaces 10b and 10c respectively, provided at support housing 10 and bounding the opening 10a.

Regarding specific physical structure of the support arm 14, it will be seen that at its upper end 14a there is also provided a substantially wedge-shaped edge 16, with a pin 17 at its central region, and which is constructed exactly as the pin 20 previously considered. In fact, an inspection of FIGURE 2 clearly shows the configuration and arrangement of such pin 17 with regard to the associated wedge-shaped edge 16. Between both of these pins 17 and 20 there is arranged a rocker or tilting spring 18, bearing at each respective end 18a and 18b upon the edges 13 and 16 respectively. It is to be understood that in the illustrated embodiment, the rocker spring 18 is assumed to be constructed as a spiral or helical pressure spring. Any undesired displacement or shifting of the rocker spring 18, such as its sliding-off from the edges 13 and 16, is prevented by both of the pins 17 and 20 which project into the aforesaid rocker spring 18, as best shown in FIGURES 1 and 3. While the pins 17 and 20 safeguard against improper shifting of the rocker spring 18 with respect to the edge 16 and 13, respectively, a stabilization or steadying bolt or pin 19, arranged internally of the rocker spring 18, prevents undesired buckling or bending of the latter. Additionally, it has been found desirable to select the length of the stabilization bolt 19 such that irrespective of the position of the support arm 14 the aforesaid bolt 19 does not extend from pin 17 to pin 20.

A closer inspection of FIGURES 1 and 3 should make it apparent that the support arm 14 in the respective terminal or end positions depicted in such figures, is held by the force of this rocker spring 18. However, when this support or prop arm 14 is pivoted, then initially the spring 18 is compressed until both spring-countersupport edges 13 and 16 confront one another. Upon further pivoting of the support arm 14 the aforementioned spring 18 expands and, in so doing, pushes the support arm 14 into the corresponding terminal position. In order to prevent undue wear of these edges 13 and 16, they can be hardened in appropriate manner. Furthermore, at both ends 18a and 18b of the rocker or tiltable spring 18 there can be provided a respective foundation or underlay disk or equivalent structure, ensuring that the aforesaid spring will properly bear against the associated edges 13 and 16.

While there is shown and described a present preferred embodiment of the invention it is to be distinctly understood that the invention is not limited thereto but may be otherwise variously embodied and practiced within the scope of the following claims.

What is claimed is:

1. A hinge connection assembly for at least one pivotable support arm for a two wheel vehicle comprising, in combination; a support housing, at least one support arm pivotably mounted from said support housing, tiltable spring means cooperating with said support arm for urging the latter into two respective terminal positions, said tiltable spring means bearing at one end against said support housing and at the other end against said support arm, said support housing and said support arm being provided with respective substantially wedge-shaped edges providing countersupport means for said tiltable spring means.

2. A hinge connection assembly as defined in claim 1 wherein said tiltable spring means comprises a helical spring, a stabilization bolt displaceably and loosely guided within said tiltable spring means, said stabilization bolt preventing buckling of said tiltable spring means.

3. A hinge connection assembly as defined in claim 1 further including a respective pin member provided at the central region of each respective substantially wedge-shaped edge which projects past its associated edge, said respective pin members cooperating with said tiltable spring means to prevent sliding-off of said tiltable spring means from said substantially wedge-shaped edges.

4. A hinge connection assembly for at least one pivotable support arm for a two wheel vehicle comprising, in combination; a support housing provided with a recess, at least one support arm pivotably mounted at one end within said recess of said support housing and extending with its other end externally of said support housing, tiltable spring means arranged in said recess and cooperating with the upper end of said support arm for urging the latter into two respective terminal positions, said tiltable spring means bearing at one end against said support housing and at the other end against said upper end of said support arm, said support housing and said support arm being provided with respective substantially wedge-shaped edges providing countersupport means for said tiltable spring means.

5. A hinge connection assembly for at least one pivotable support arm for a two wheel vehicle comprising, in combination; a support housing provided with a recess, said support housing including a pair of spaced impact surfaces for a support arm, at least one support arm pivotably mounted at one end within said recess of said support housing and extending with its other end externally of said support housing, tiltable spring means comprising a helical spring arranged in said recess and cooperating with the upper end of said support arm for urging the latter into two respective terminal positions and against the associated impact surfaces, said tiltable spring means bearing at one end against said support housing and at the other end against said upper end of said support arm, said support housing and said support arm being provided with respective substantially wedge-shaped edges providing countersupport means for said tiltable spring means, a stabilization bolt loosely and displaceably arranged internally of said tiltable spring means for preventing buckling of said tiltable spring means, and means provided at each substantially wedge-shaped edge for securing said tiltable spring means and preventing sliding-off from said substantially wedge-shaped edges.

6. An assembly as claimed in claim 5 wherein said means for preventing sliding-off of the spring means from the wedge-shaped edges comprises a pin centrally disposed at each of said wedge-shaped edges projecting therefrom.

7. An assembly as claimed in claim 6 wherein said stabilization bolt has a length which is less than the closest distance between said pins.

8. An assembly as claimed in claim 5 wherein said ends of the spring means are directly seated on the wedge-shaped edges of the support housing and the support arm.

References Cited

UNITED STATES PATENTS

| | | | |
|---|---|---|---|
| 2,587,790 | 3/1952 | Thalman | 280—301 |
| 2,623,236 | 12/1952 | Borchers et al. | 16—182 |

MARVIN A. CHAMPION, *Primary Examiner.*

D. L. TROUTMAN, *Assistant Examiner.*